United States Patent [19]

Christopulos

[11] Patent Number: 4,678,728
[45] Date of Patent: Jul. 7, 1987

[54] INTERCONNECTOR DEVICE

[75] Inventor: John A. Christopulos, Oakhurst, N.J.

[73] Assignee: The United States of America as represented by the Secretary of the Army, Washington, D.C.

[21] Appl. No.: 909,364

[22] Filed: Sep. 17, 1986

[51] Int. Cl.$^4$ ............................................... H01M 2/20
[52] U.S. Cl. ..................................... 429/121; 429/123; 429/178; 439/627; 439/655
[58] Field of Search ................... 429/121, 122, 123, 1, 429/178, 179, 170, 101; 339/184 M, 278 M, 228, 29 B, 46, 154 A, 152

[56] References Cited

U.S. PATENT DOCUMENTS

| | | | |
|---|---|---|---|
| 1,934,498 | 11/1933 | Guedon | 339/155 T |
| 2,225,460 | 12/1940 | Porth | 429/123 |
| 4,084,037 | 4/1978 | Morton | 429/121 X |
| 4,117,203 | 9/1978 | Sjogren | 429/121 X |
| 4,211,968 | 7/1980 | Sugalski | 429/121 X |
| 4,213,079 | 7/1980 | Mullersman | 429/121 X |
| 4,229,686 | 10/1980 | Mullersman et al. | 429/121 X |
| 4,250,443 | 2/1981 | Kazamir | 429/121 X |

Primary Examiner—Anthony Skapars
Attorney, Agent, or Firm—Sheldon Kanars; Jeremiah G. Murray; John K. Mullarney

[57] ABSTRACT

An interconnector device permits a lithium-sulfur-dioxide battery (e.g., the BA5847/U) to be substituted for a standard Leclanche battery (e.g., the BA200/U). The lithium-type battery can therefore be used in its customary manner or, with the interconnector, as a substitute for the Leclanche battery; battery proliferation is thereby reduced. The interconnector comprises a rectangular wafer of plastic material with a pair of prongs mounted on one flat surface of the wafer and at a location which corresponds to that of female sockets of the lithium-type battery. A pair of coil spring connectors are mounted on the opposite flat surface of the wafer and at locations which correspond to the locations of the coil spring connectors of the Leclanche battery. The prongs and coil spring connectors of the interconnector are electrically interconnected in parallel.

2 Claims, 7 Drawing Figures

INTERCONNECTOR DEVICE

The invention described herein may be manufactured, used and licensed by or for the Government for governmental purposes without the payment to me of any royalties thereon.

TECHNICAL FIELD

The present invention relates in general to batteries and, more particularly, to a battery interconnector device which can be utilized to reduce battery proliferation.

BACKGROUND OF THE INVENTION

The military makes extensive use of the standard Leclanche (zinc-manganese-dioxide) BA200/U battery, made by Union Carbide and others. This is a 6 volt, non-rechargeable battery which is used to provide the power for test meters (e.g., ohm-meters), radio receivers, etc. For most purposes this battery has heretofore proven to be quite satisfactory. However, it is not without some shortcomings. For example, it has temperature range restrictions (i.e., 0°-125° F.); a current capability restriction (approximately 0.150 amperes); and, a limited battery storage life ($\leqq 2$ years).

A lithium-sulfur-dioxide battery similar in outward appearance in all respects to the BA200/U can, of course, be made for field conditions, equipment requirements, and other situations where operative temperature range, current capacity and shelf storage life are important considerations. A lithium-sulfur-dioxide battery (e.g., BA5847/U) will provide operational capability to electronic equipment(s) at temperatures ranging from $-65°$ F. to $160°$ F., with a battery storage life at ambient conditions of five or more years. Also, the current capacity of the latter battery is substantial (e.g., 2 amperes).

To make an outwardly similar lithium-sulfur-dioxide battery as a substitute for the standard Leclanche BA200/U, for those situations that demand such a substitution, would result in undue proliferation.

The BA5847/U is a readily available lithium-sulfur-dioxide (6 volt) battery produced by Power Conversion Inc. and others. Unfortunately, the BA5847/U is different in outward appearance (e.g., connector location and connector configuration or type) from the Lechanche BA200/U and hence cannot be readily substituted for the latter.

SUMMARY OF THE INVENTION

It is a primary object of the present invention to reduce (battery) proliferation.

The above and other objects are achieved in accordance with the present invention by the use of an interconnector device which permits a more versatile battery (e.g., the BA 5847/U) to be substituted for another and different battery (e.g., the BA200/U). Thus the aforesaid versatile battery can be utilized in its customary manner or as a substitute for the other battery. More specifically, the interconnector device comprises a flat wafer of plastic material of predetermined size and configuration. A pair of connecting elements (e.g., prongs) are disposed on one flat surface of the wafer and at a location which corresponds to the location of the connecting elements (e.g., female sockets) of the aforesaid versatile battery. A second pair of connecting elements are disposed on the opposite flat surface of the wafer. The connecting elements of this second pair have a configuration the same as the connecting elements of the other battery and they are positioned at locations which correspond to the locations of the elements of the latter battery. The two pairs of connecting elements mounted on opposite surfaces of the wafer are interconnected in parallel.

BRIEF DESCRIPTION OF THE DRAWINGS

The invention will be more fully appreciated from the following detailed description when the same is considered in connection with the accompanying drawings in which.

DETAILED DESCRIPTION

Figure 1B:
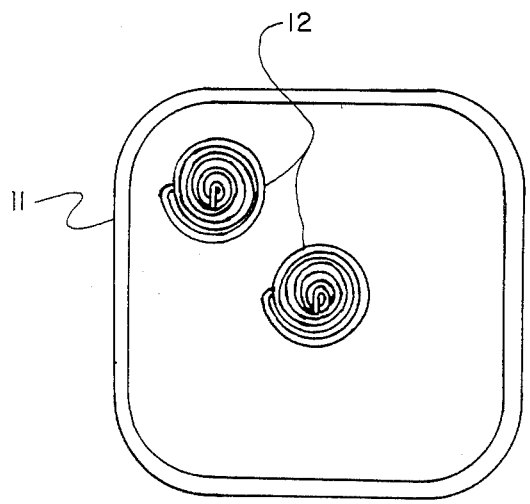
FIGS. 1A and 1B are elevation and top views of a prior art battery.
Figure 1A:
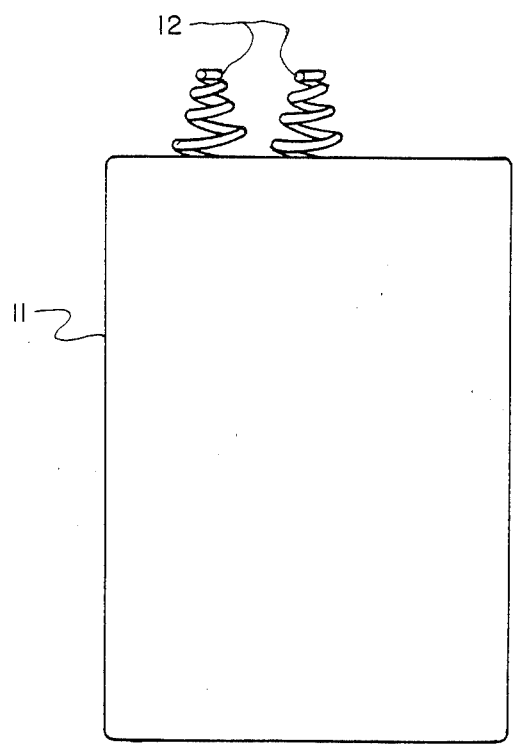

Turning now to FIGS. 1A and 1B of the drawings, there is shown a Leclanche BA200/U battery 11. This is a 6 volt non-rechargeable battery, with a current capability of about 0.15 amperes. As previously noted, this is a commercially available item. The BA200/U battery is 2 and ⅝ inches by 2 and ⅝ inches, with a height of about 3 and 27/32 inches. The battery connector(s) comprises a pair of coil springs 12, which extend approximately 9/16 of an ince above the top or upper surface of the battery. The electronic equipment (not shown) to be powered by the BA200/U battery will comprise a pair of terminals that are pressed against, and thereby depress, the coil springs 12 so as to establish electrical contact. One coil spring is centrally located on the battery and the other is off-center by approximately one inch ($\pm 1/16$ of an inch).

Figure 2B:
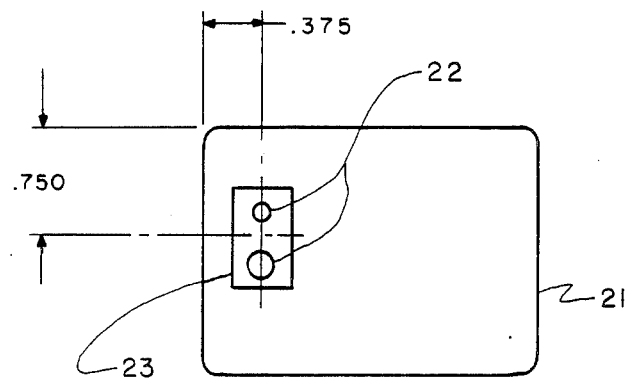
FIGS. 2A and 2B are elevation and top views of another prior art battery.
Figure 2A:
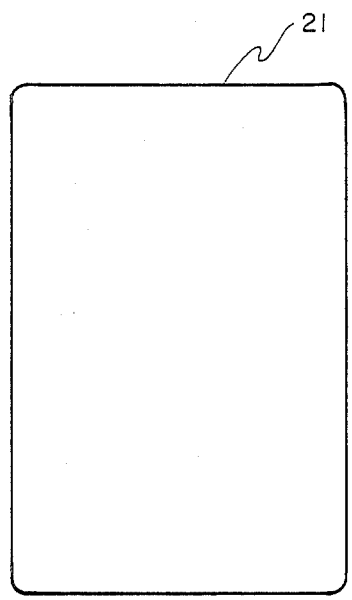

FIGS. 2A and 2B show a BA5847/U battery 21. This is a lithium-sulfur-dioxide battery having the advantageous characteristics previously set forth. This also is a 6 volt non-rechargeable battery, but it has increased current capacity (2.0 amperes) and is approximately one-third the weight of the BA200/U battery. The BA5847/U is also a commercially available item. The BA5847/U battery is 1.500 inches by 2.550 inches, with a height of about 3.750 inches. For present purposes, the respective heights of the two batteries is unimportant. As will be noted in FIG. 2B, the connector (female sockets or holes 22) is positioned off-center. The designation of this connector is "MIL-B-18D (2-hole) type IV"; this designation is a standard and is well known to those skilled in this art. Now while the BA5847/U battery could readily fit into the close-fitting compartment or well which typically receives the BA200/U battery, the BA5847/U cannot be substituted for the latter battery because of their very different connectors and the different locations of the same.

For clearance purposes, a small rectangular, slightly recessed, section 23 surrounds the connector sockets 22. This slight recess is unimportant for present purposes and can be disregarded.

Noting the dimensions of the previously discussed exemplary batteries and particularly the different configurations and locations of their respective connectors, it is the primary principle of the present invention to provide in interconnection device which will allow a given battery (e.g., the BA5847/U) to be used as a substitute for another and different battery (e.g., the BA200/U). Such a device will serve to achieve the above-stated object of reducing battery proliferation. More particularly, the BA5847/U can be used in its usual manner or, with the aid of an interconnector device in accordance with the invention, it can be used as a substitute for the BA200/U battery.

Figures 3A, 3B, 3C:
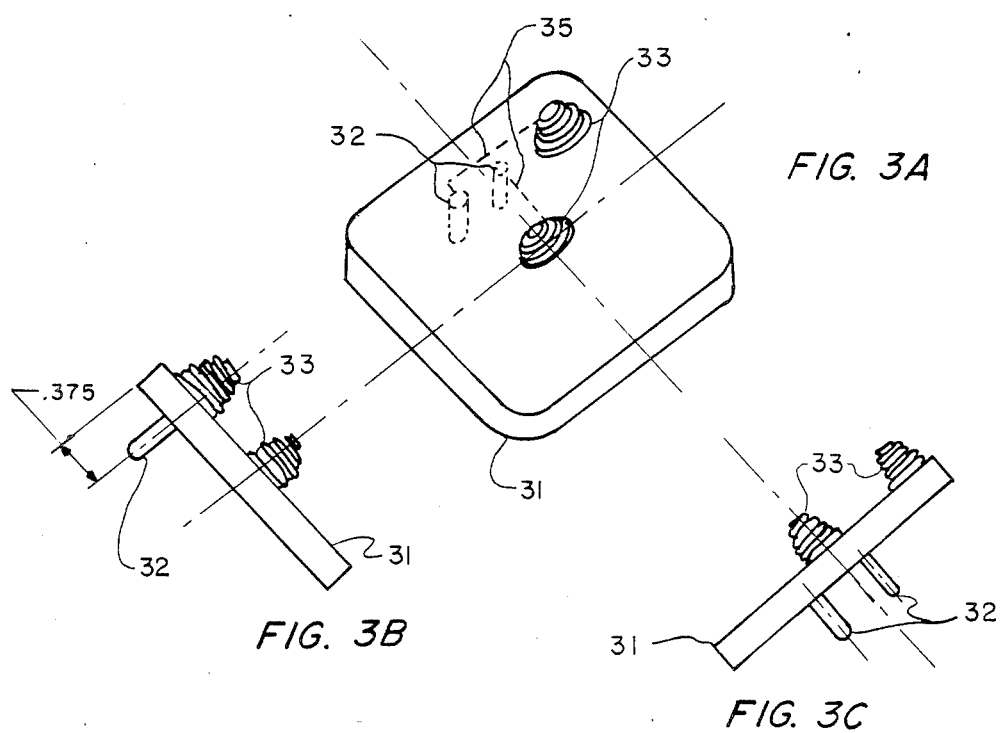
FIG. 3A is a perspective view of an interconnector device in accordance with the present invention.
FIGS. 3B and 3C are two end views of the interconnector device of FIG. 3A.

Turning now more specifically to FIGS. 3A-3C of the drawings, the interconnector device shown therein comprises a flat rectangular piece 31 of phenolic-type molding material. This piece or wafer of plastic is approximately 2 and ⅝ inches by 2 and ⅝ inches, with a thickness of about 0.125 of an inch. A pair of connecting elements or prongs 32 are mounted on one flat surface (i.e., the underside) of the wafer 31. The prongs 32 are disposed at a location which corresponds to the location of the connecting elements or female sockets 22 of the BA5847/U battery shown in FIGS. 2A-B. When the interconnector device is mounted on the BA5847/U battery the prongs 32 are received into the sockets 22.

A second pair of connecting elements in the form of coil springs 33 are disposed on the opposite flat surface (i.e., the upper side) of the square wafer 31. These coil springs are like the coil springs 12 of the BA200/U battery shown in FIGS. 1A-B; furthermore, they are positioned on the wafer 31 at locations which correspond to the locations of the coil springs of the latter battery. Accordingly, when the BA5847/U battery with the mounted interconnector device is substituted for the BA200/U battery, the pair of terminals of the user equipment will pressure engage the coil springs 33 in much the same way as these terminals press against and thereby engage the coil springs 12 of the BA200/U battery. The pressure engagement, of course, establishes electrical contact.

The pair of connectors 32 and 33 are electrically interconnected in parallel, as suggested by the dotted lines 35 of FIG. 3A. This is readily accomplished during manufacture of the interconnector by plating two thin electrical stripes on the underside of the water 31 between the respective connecting elements. The coil springs 33 must, of course, extend through the wafer 31 to the underside surface.

The battery 21 with the mounted interconnector device of FIG. 3A can be readily accommodated by the equipment compartment or well which normally receives the BA200/U battery. Moreover, since the interconnector device has the same (cross-sectional) dimensions (2 and ⅝ inches by 2 and ⅝ inches) as the battery 11, the interconnector also serves as a guide and securing block for the BA5847/U battery within the confines of the battery compartment of the user equipment.

While specific batteries have been cited for disclosure purposes, it should be clear to those in the art that the principles of the invention have wider applicability. It is to be understood, therefore, that the foregoing disclosure relates to only a particular embodiment of the invention, and a specific use thereof, and that numerous modifications or alterations may be made therein without departing from the spirit and scope of the invention.

What is claimed is:

1. An interconnector device that allows a lithium-type battery to be substituted for a Leclanche battery, said Leclanche battery being of predetermined dimensions and having a pair of coil spring connection terminals at predetermined locations on the top surface thereof, said lithium battery being of different predetermined dimensions than said Lechanche battery and having a pair of female connection sockets positioned at a predetermined off-center location on the top surface thereof, the locations of said coil spring terminals and said connection sockets of the respective batteries being at substantially different non-matching positions, comprising a thin flat wafer of non-conductive material of predetermined size and configuration, said wafer having the same cross-section dimensions as said Leclanche battery, a pair of prongs on the underside surface of said wafer and at locations which correspond to the locations of the female connection sockets of said lithium battery, the prongs being received into said female connection sockets when the interconnector device is mounted on said lithium battery, a pair of coil spring connection terminals mounted on the opposite or top surface of said wafer and having a configuration which matches that of the connection terminals of said Leclanche battery and being positioned at locations which corresponds to the locations of the coil spring connection terminals of the Leclanche battery, and a pair of electrical conductors plated on the underside surface of said wafer for respectively interconnecting the pair of prongs and the pair of coil spring connection terminals in parallel.

2. An interconnector device as defined in claim 1 wherein said Leclanche battery is typically received into a tight-fitting compartment or well, said lithium battery having dimensions that permit the same to also be received into said tight-fitting compartment, the mounted interconnector device serving as a guide and securing block for said lithium battery within the confines of said compartment, said wafer having a thickness of substantially 0.125 of an inch.

* * * * *